(12) United States Patent
Ozcan et al.

(10) Patent No.: US 10,207,427 B2
(45) Date of Patent: Feb. 19, 2019

(54) CARBON FIBER REINFORCEMENTS FOR SHEET MOLDING COMPOSITES

(71) Applicant: UT-Battelle, LLC, Oak Ridge, TN (US)

(72) Inventors: Soydan Ozcan, Oak Ridge, TN (US); Felix L. Paulauskas, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 15/782,907

(22) Filed: Oct. 13, 2017

(65) Prior Publication Data

US 2018/0071958 A1 Mar. 15, 2018

Related U.S. Application Data

(62) Division of application No. 14/672,703, filed on Mar. 30, 2015, now Pat. No. 9,815,224.

(51) Int. Cl.
*D06B 11/00* (2006.01)
*B29C 70/12* (2006.01)
(Continued)

(52) U.S. Cl.
CPC .......... *B29B 15/125* (2013.01); *B29B 15/127* (2013.01); *B29C 70/12* (2013.01); *C08J 5/042* (2013.01); *C08J 5/06* (2013.01); *D02J 1/18* (2013.01); *D06B 11/0003* (2013.01); *B29K 2063/00* (2013.01); *B29K 2307/04* (2013.01); *C08J 2331/00* (2013.01); *C08J 2331/02* (2013.01); *C08J 2363/00* (2013.01); *C08J 2367/06* (2013.01)

(58) Field of Classification Search
None
See application file for complete search history.

(56) References Cited

U.S. PATENT DOCUMENTS 4,451,528 A * 5/1984 Krause ................... B29C 70/46
428/300.4
5,525,180 A 6/1996 Paul, Jr. et al.
(Continued)

FOREIGN PATENT DOCUMENTS

JP 2014125698 A * 7/2014
WO 2013166182 11/2013

OTHER PUBLICATIONS

Machine translation of JP 2014-125698 A, retrieved Oct. 2018 (Year: 2018).*
(Continued)

*Primary Examiner* — Nicole M. Buie-Hatcher
(74) *Attorney, Agent, or Firm* — Joseph A. Marasco; Colin L. Cini

(57) ABSTRACT

A method of processing a carbon fiber tow includes the steps of providing a carbon fiber tow made of a plurality of carbon filaments, depositing a sizing composition at spaced-apart sizing sites along a length of the tow, leaving unsized interstitial regions of the tow, and cross-cutting the tow into a plurality of segments. Each segment includes at least a portion of one of the sizing sites and at least a portion of at least one of the unsized regions of the tow, the unsized region including and end portion of the segment.

2 Claims, 12 Drawing Sheets

(51) Int. Cl.
    *B29B 15/12*     (2006.01)
    *C08J 5/04*     (2006.01)
    *D02J 1/18*     (2006.01)
    *C08J 5/06*     (2006.01)
    *B29K 307/04*     (2006.01)
    *B29K 63/00*     (2006.01)

(56) References Cited

U.S. PATENT DOCUMENTS

| | | | |
|---|---|---|---|
| 5,756,206 A | 5/1998 | Davies et al. | |
| 5,948,473 A | 9/1999 | Saito et al. | |
| 7,410,628 B2* | 8/2008 | Bening | D01F 11/22 423/447.1 |
| 2003/0220035 A1* | 11/2003 | Fjare | C08G 18/683 442/103 |
| 2005/0053787 A1* | 3/2005 | Yamasaki | B29C 70/00 428/411.1 |
| 2011/0024694 A1* | 2/2011 | Shah | C08J 5/042 252/502 |
| 2011/0168942 A1* | 7/2011 | Hitoe | B82Y 30/00 252/74 |
| 2012/0213997 A1 | 8/2012 | Wang et al. | |
| 2013/0309492 A1 | 11/2013 | Seike et al. | |
| 2014/0151111 A1* | 6/2014 | Shah | H05K 9/009 174/388 |
| 2014/0151610 A1* | 6/2014 | Kim | C09K 19/3809 252/511 |
| 2015/0132573 A1* | 5/2015 | Le Costaquec | D01F 9/12 428/367 |
| 2016/0276246 A1* | 9/2016 | Yamaguchi | H01L 23/3737 |

OTHER PUBLICATIONS

Solution for Carbon Fiber Wet-Out Issue for Low Cost Sheet Molding Carbon Fiber Composite Production, Innovations in Manufacturing, ORNL Manfacturing Demonstration Facility, Technical Collaboration Final Report, U.S. Dept. of Energy, Advanced Manufacturing, published Nov. 17, 2014, pp. 1-7.

\* cited by examiner

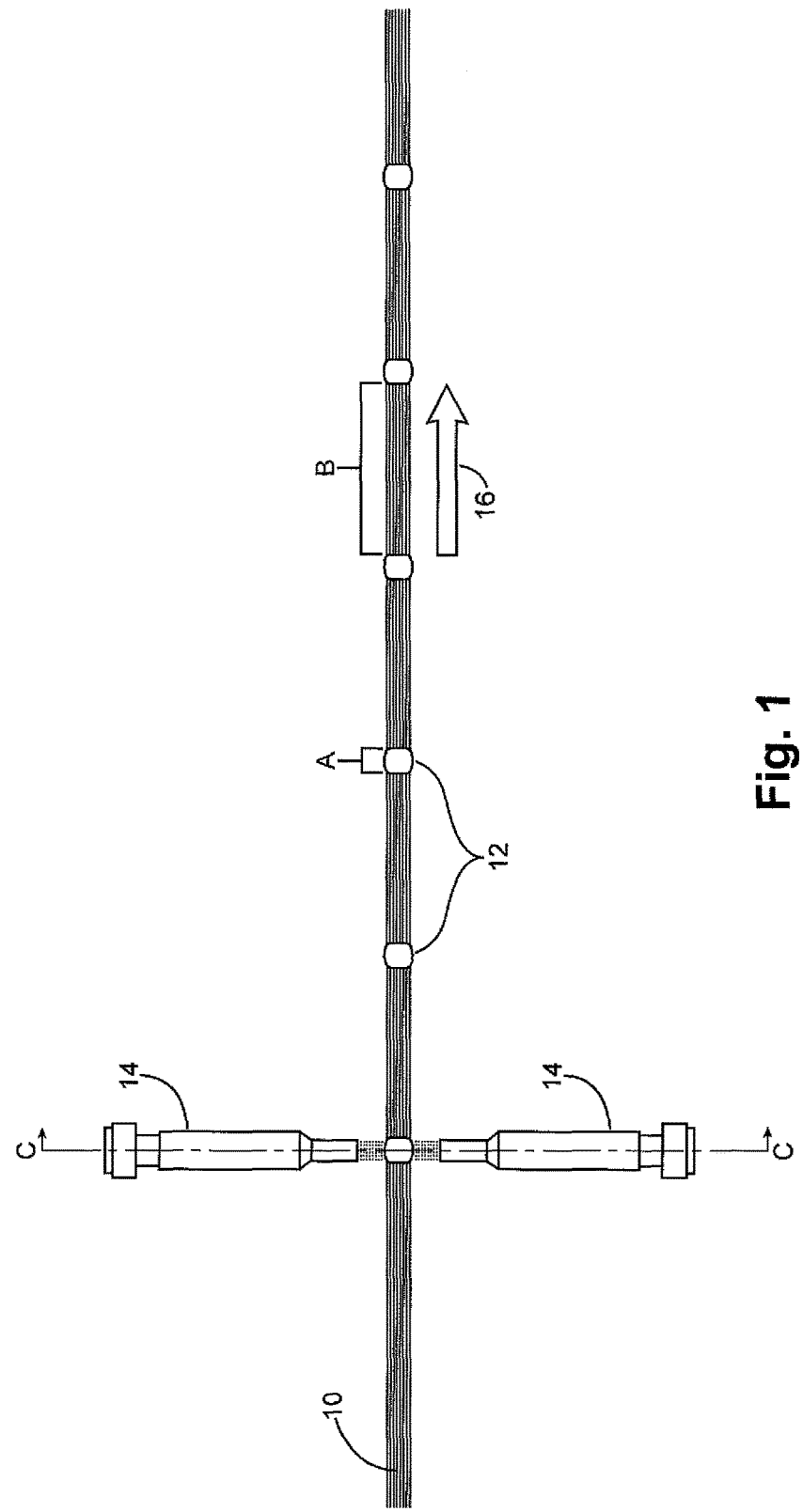

CARBON FIBER REINFORCEMENTS FOR SHEET MOLDING COMPOSITES

CROSS-REFERENCE TO RELATED APPLICATIONS

This patent application is a divisional of, and claims priority to, U.S. application Ser. No. 14/672,703 filed on 30 Mar. 2015 and entitled, "Carbon Fiber Reinforcements for Sheet Molding Composites", now U.S. Pat. No. 9,815,224, the entire content of which is incorporated herein by reference as if included at length.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

BACKGROUND OF THE INVENTION

Glass fibers are currently used in sundry composite structural materials that are comprised of a resin matrix having fibers dispersed therein, often called Sheet Molding Composite (SMC). Examples of the large range of SMC applications include automotive, watercraft, and aircraft bodies, building structures, and containment structures. Although widely employed with glass fibers, SMC processes are not typically practiced with carbon fiber due to the insufficient wetting (wet-through, infiltration) of the carbon fiber which causes poor processability resulting in poor mechanical properties.

Multifilament carbon fiber tows (also called a bundles or ropes) comprising a plurality of carbon fiber filaments (hereinafter called filaments) are typically sold in tows, fully sized along the length thereof. Sizing is a usually proprietary coating material that is applied to an entire carbon fiber tow at 0.5 to 5 percent of the weight of the carbon fiber. A general purpose of sizing is to protect the carbon fiber during handling and processing (winding and weaving, for example) into intermediate forms, such as dry fabric and prepreg. Sizing also holds filaments together in the tow to reduce disintegration (for example, fraying, unraveling, tattering, and the like), thereby improving processability of the tow. Moreover, sizing increases interfacial shear strength between the fiber and matrix resin.

Carbon fibers have heretofore been limited in the applicability thereof to SMC materials. Current industrially adopted surface treatment processes are not sufficient to produce adequate surface functionality for desired low-cost carbon fibers that are compatible with both thermoplastic and thermoset matrix resins. For example, use of sized carbon fibers for SMC produces has been difficult because the sizing prevents sufficient wet-through of the fiber tow by the matrix resin. Thus, inadequate wet-through causes poor bonding of the matrix to the carbon fibers and significantly weakens the SMC, resulting in insufficient mechanical properties for intended applications.

Moreover, use of unsized carbon fibers is not desirable because of a condition known as fuzz and/or disintegration. The carbon fiber tows tend to fuzz and/or disintegrate when mixed with the matrix resin and become entangled and/or agglomerated, causing blockages, voids, and breakages, which significantly weaken the SMC, resulting in insufficient mechanical properties for many intended applications.

It is desirable to improve carbon fiber wettability in order to achieve a more thorough and sufficient resin wet-through into a carbon fiber tow while minimizing fuzz and disintegration.

BRIEF SUMMARY OF THE INVENTION

In accordance with one aspect of the present invention, the foregoing and other objects are achieved by a method of processing a carbon fiber tow that includes the steps of providing a carbon fiber tow made of a plurality of carbon filaments, depositing a sizing composition at spaced-apart sizing sites along a length of the tow, leaving unsized interstitial regions of the tow, and cross-cutting the tow into a plurality of segments. Each segment includes at least a portion of one of the sizing sites and at least a portion of at least one of the unsized regions of the tow, the unsized region including and end portion of the segment.

In accordance with another aspect of the present invention, a reinforcement component includes a bundle of carbon filaments that define at least one unsized end region wherein said filaments can repel each other and separate, the bundle further defining a sized region wherein the filaments are bound together by a sizing composition.

In accordance with a further aspect of the present invention, a composite includes a resin matrix and a reinforcement component dispersed therein, the reinforcement component comprising a plurality of bundles of carbon filaments, each of the bundles defining at least one unsized end region wherein the filaments can repel each other and separate, the bundle further defining a sized region wherein the filaments are bound together by a sizing composition.

BRIEF DESCRIPTION OF THE DRAWINGS

FIG. 1 is a schematic diagram showing spray deposition of spaced-apart sizing spots on a carbon fiber tow in accordance with an example of the present invention.

Figure 4:
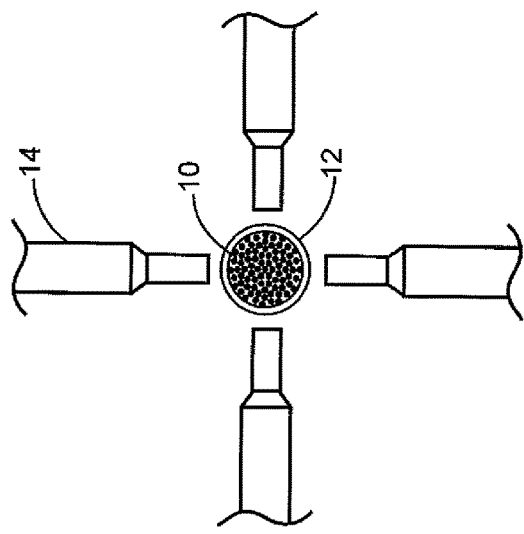
FIG. 4 is a cross-sectional view of an alternative example of that shown in FIG. 2.

For a better understanding of the present invention, together with other and further objects, advantages and capabilities thereof, reference is made to the following disclosure and appended claims in connection with the above-described drawings.

DETAILED DESCRIPTION OF THE INVENTION

It is established that sizing is beneficial for a carbon fiber tow (hereinafter called a tow) in order to hold the filaments together in the tow during processing, preventing disintegration of the tow. Moreover, advantages of an unsized tow include high surface energy, which promotes wetting of the filaments for improved wet-through.

The present invention resolves the issues described hereinabove by combining the benefits of sized carbon fibers with the advantages of unsized carbon fibers. A tow is processed to result in a plurality of carbon fiber segments (hereinafter called segments). In each segment, the filaments are bound together by a local spot-application of sizing while at least one of the ends of the segment is unsized and thus the filaments are not held together, but repel each other by an electrostatic effect. Electrostatic effect can be generated and/or enhanced by the action of enhanced by cutting of the tow into segments and also by application of a bias potential to the tow during processing. Thus, the un-sized segment ends remain wettable and separated, which significantly enhances wettability and resin infiltration into the segment, with perhaps the exception of the sized spot.

A suitable tow can be made from any source material, including but not limited to pitch, polyacrylonitrile (PAN), lignin, or any combination of the foregoing, for example. There are no general limitations on the diameter of a tow, diameter of filaments within a tow, the number of filaments within a tow, or the length of a tow.

Sizing composition should be compatible with the particular carbon fibers used in the process. Resin composition should also be compatible with the particular carbon fibers used in the process. For example, epoxy-based resins, ester-based resins, and unsaturated polyester-based resins are compatible with all conventional carbon fibers.

Referring now to the drawings, in which like referenced characters designate like or corresponding components or materials throughout the several figures, there is shown in FIG. 1 a carbon fiber tow 10, upon which sizing spots 12 are applied intermittently to sizing sites of nominal length A, leaving unsized interstitial regions of length B by applicators 14. The tow 10 is moving in the direction of the arrow 16. The applicators 14 could move in the opposite direction to achieve relative motion.

The skilled artisan will recognize that the length of the sizing sites A and unsized interstitial regions B are predetermined by at least (1) controlling the time period of the application of sizing spots 12, (2) selection of applicator type and size, and/or (3) controlling the speed of the tow 10 in the direction of the arrow 16. The amount of sizing applied to each sizing spot 12 is further determined by controlling sizing feed rate through the applicators 14.

Figure 3:
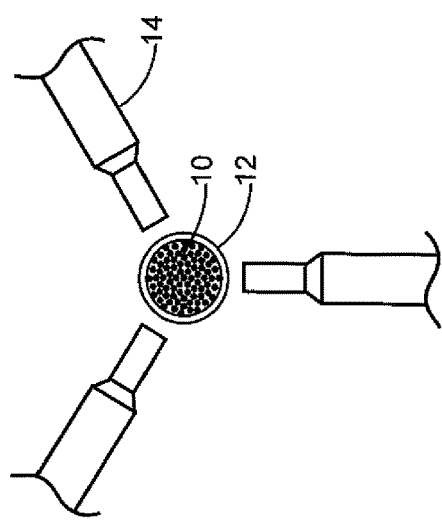
FIG. 3 is a cross-sectional view of an alternative example of that shown in FIG. 2.
Figure 2:
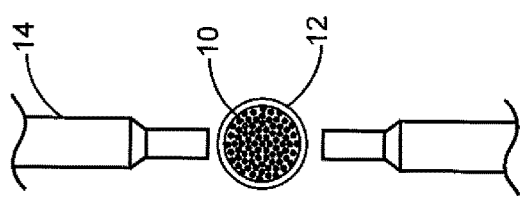
FIG. 2 is a cross-sectional view through C-C' of FIG. 1.

It is important that the sizing spots 12 fully coat the tow 10 around the circumference thereof as shown in FIG. 2. Additional applicators 14 may be used to achieve a fully circumferential coating of sizing, as shown in FIGS. 3, 4. The sizing 12 can partially or fully penetrate through the tow 10.

Figure 5:
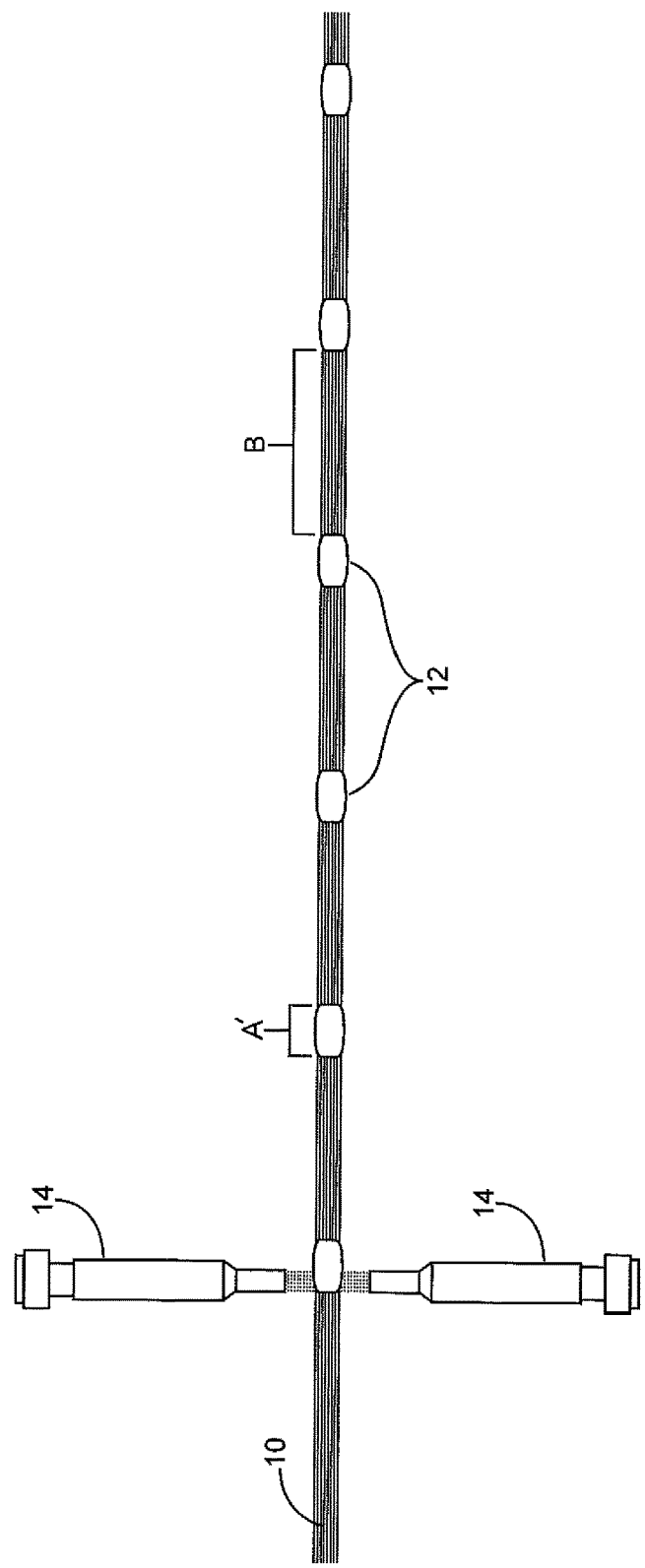
FIG. 5 is a schematic diagram showing spray deposition of spaced-apart sizing spots on a carbon fiber tow in accordance with an example of the present invention.
Figure 6:
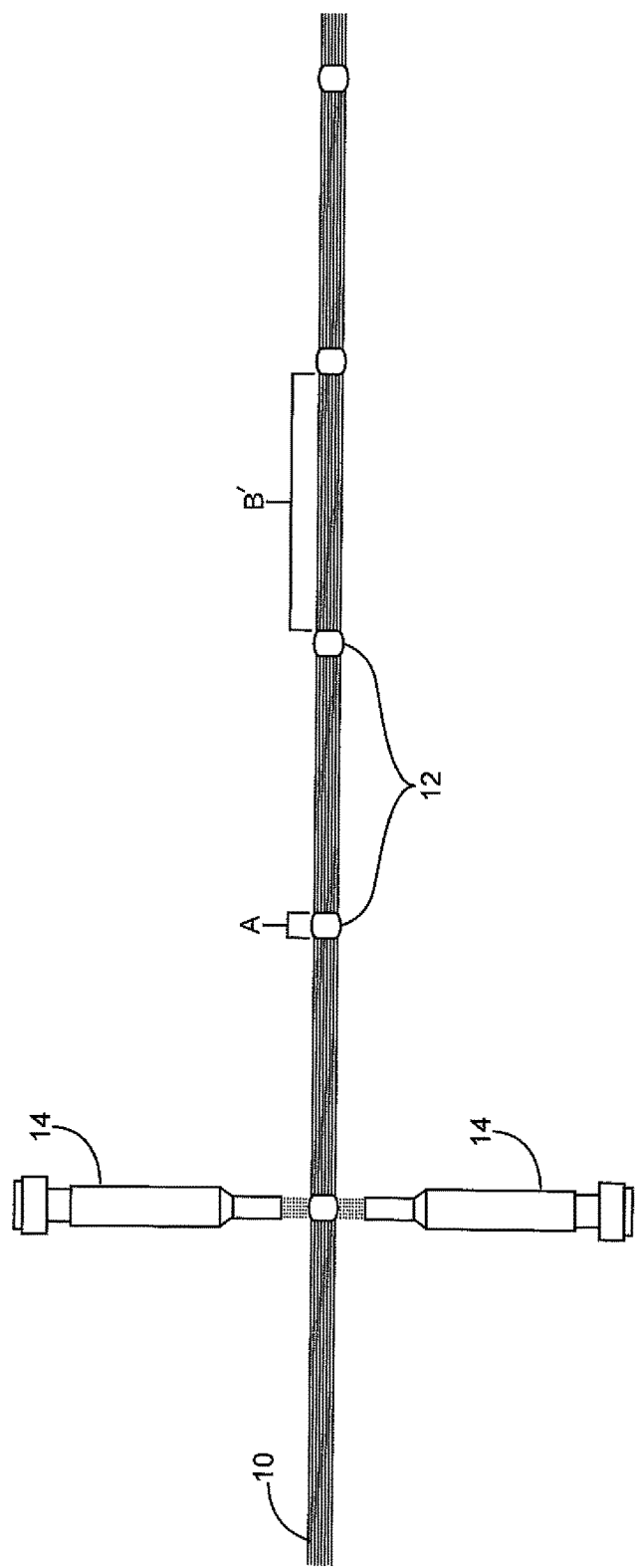
FIG. 6 is a schematic diagram showing spray deposition of spaced-apart sizing spots on a carbon fiber tow in accordance with an example of present invention.

FIG. 5 shows an example of a longer sizing spot 12 (A'), while FIG. 6 shows an example of a longer unsized interstitial region B'. It is contemplated that length of the sizing sites A, unsized interstitial regions B, and amount of sizing per spot would in many applications be consistent and regular due to ease of manufacture. The drawings show consistency and regularity in the shapes, sizes, thicknesses, and spacings of sizing spots. However, the invention can be practiced without such consistency and regularity. Sizing spots can be irregular in shape, size, thickness, and spacing, and still provide at the advantages of the present invention to some degree.

Figure 7:
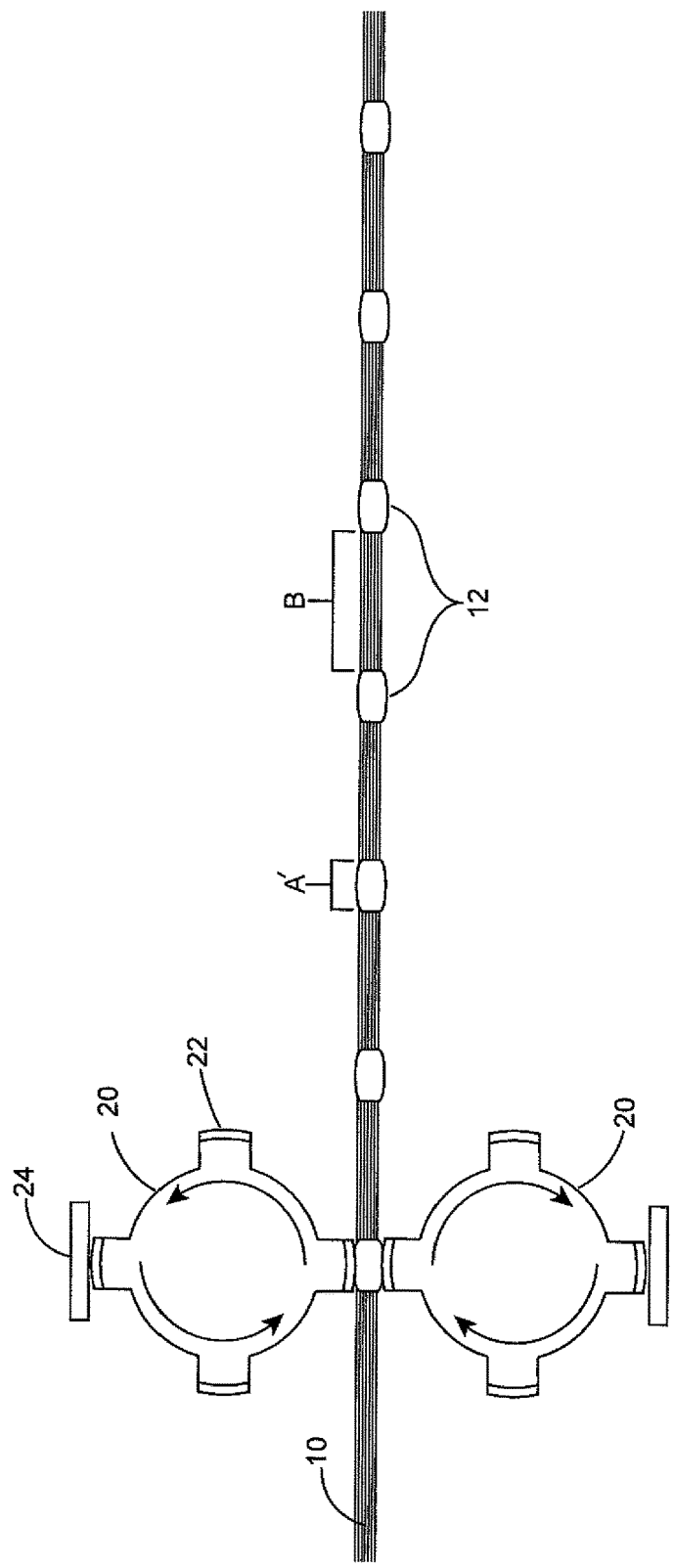
FIG. 7 is a schematic diagram showing roller deposition of spaced-apart sizing spots on a carbon fiber tow in accordance with an example of present invention.
Figure 8:
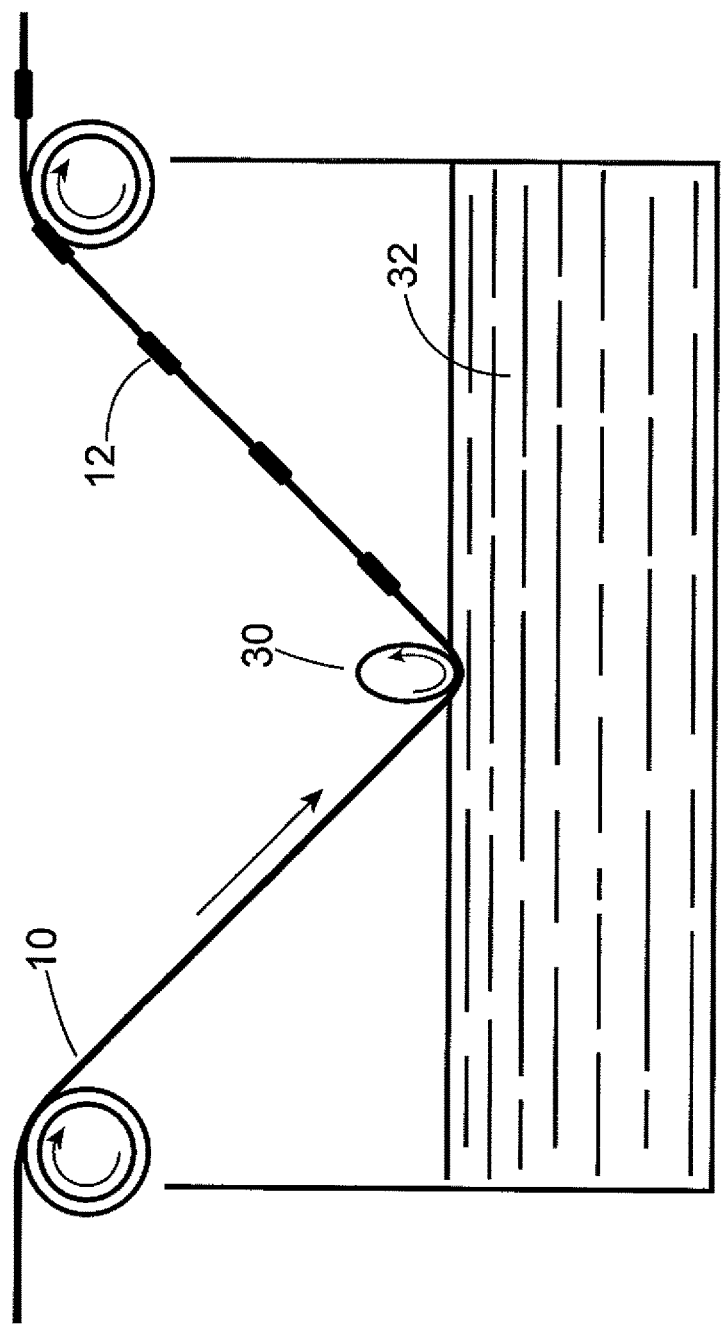
FIG. 8 is a schematic diagram showing a first view of eccentric roller dipping deposition of spaced-apart sizing spots on a carbon fiber tow in accordance with an example of present invention.
Figure 9:
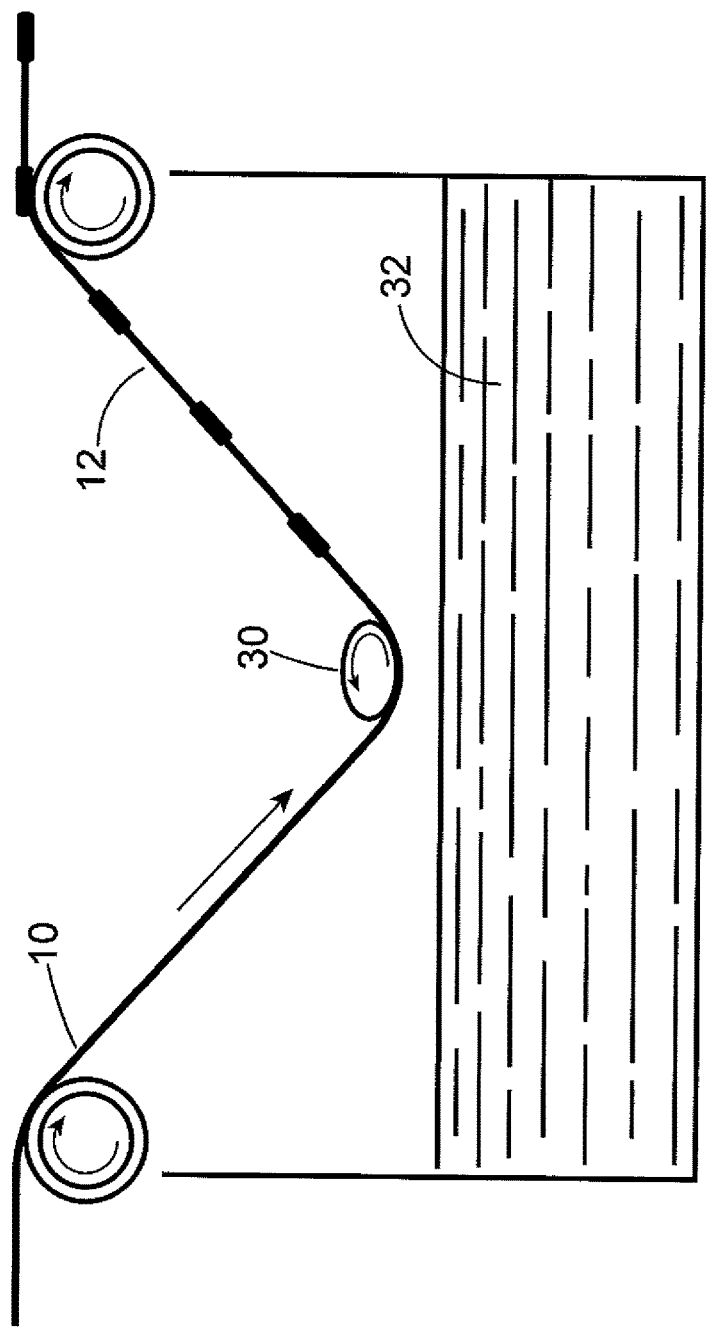
FIG. 9 is a schematic diagram showing a second view of eccentric roller dipping deposition of spaced-apart sizing spots on a carbon fiber tow in accordance with an example of present invention.

FIG. 7 shows an example of application by segmented rollers 20 having applicator segments 22 and sizing supply means 24. FIGS. 8, 9 show an example of application by an eccentric roller 30 that dips the tow 10 into a sizing solution 32. The skilled artisan will recognize that the sizing spots 12 can be applied to the tow 10 by any of sundry conventional application means.

Following application thereof, the sizing spots 12 can be dried at an elevated temperature in accordance with well-known, conventional methods of drying sizing. For example, sizing can be dried at a temperature in the range of 40 to 80° C. for a time period in the range of 0.5 to 10 min.

Following application and drying sizing, the tow 10 can be surface treated to activate the surfaces of the filaments in un-sized portion B thereof. Surface treatment can include any well-known method such as, for example, conventional gas phase thermochemical method, a conventional plasma-based method, etc.

Subsequent steps can be carried out in an inert, dry environment such as nitrogen, dry air, or other inert, dry gas, for example, to protect the surface-treated tow 10 from deleterious effects of humidity until it is brought into contact with the matrix material.

Figure 10:
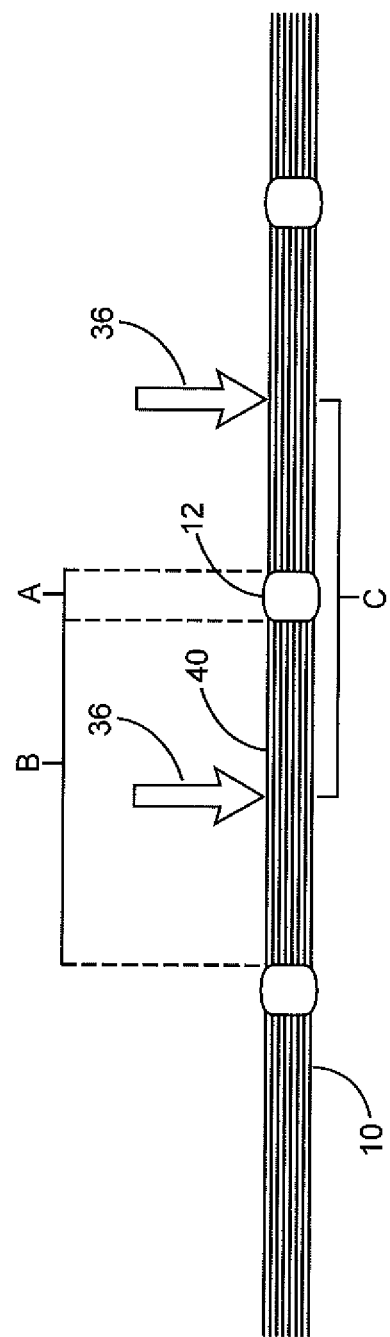
FIG. 10 is a schematic diagram showing carbon fiber cutting locations in accordance with an example of present invention.

Referring now to FIG. 10, the tow 10 is cross-cut. Cross-cutting can, for example, be generally be centered within the unsized interstitial regions B, at locations indicated by arrows 36. Cross-cutting in this manner results in discrete segments 40 of length C by severing, cutting, shearing, chopping, or the like. Each segment 40 generally comprises one sizing spot 12 and a portion of the tow 10 on either side thereof, the length C being generally equal to the sum of the lengths of a sizing site A and an unsized interstitial region B.

Figure 11:
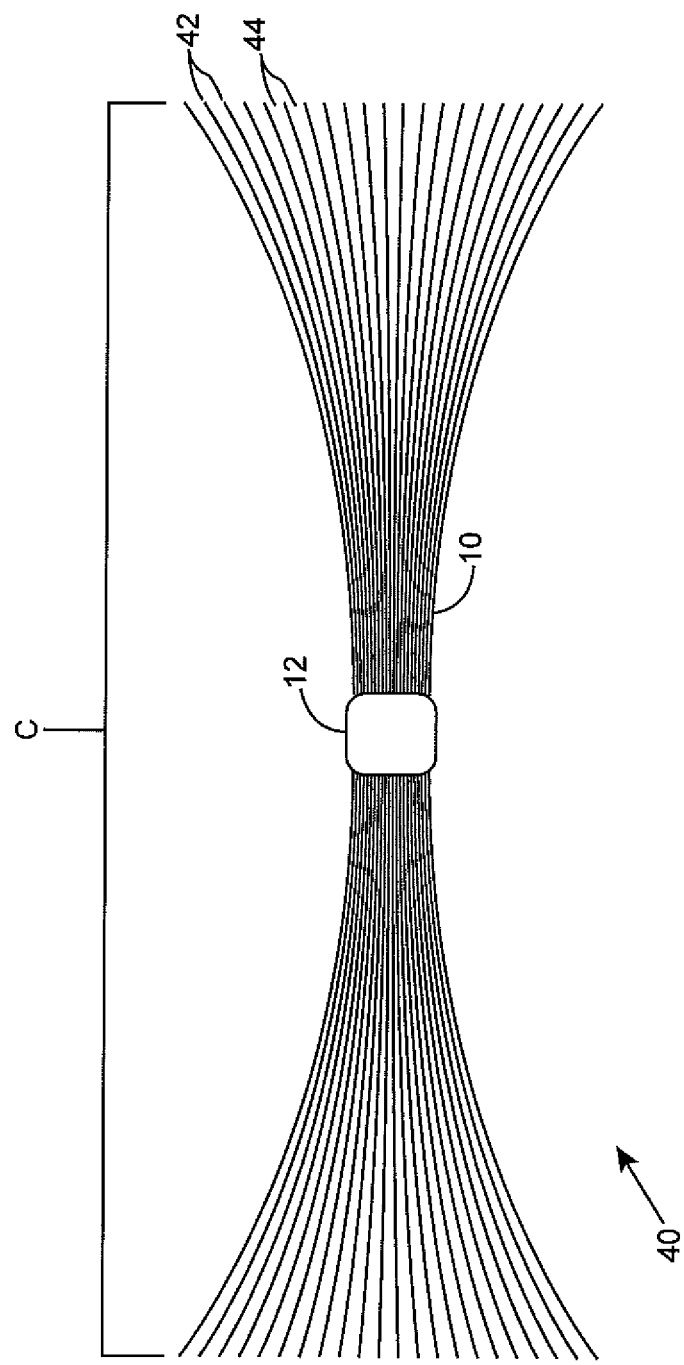
FIG. 11 is a schematic diagram showing a carbon fiber segment (reinforcement component) in accordance with an example of present invention.

FIG. 11, shows a segment 40, which is in this example a somewhat bowtie-shaped bundle of carbon filaments 42. The sizing at the sizing site 12 binds the filaments 42 together, while the carbon filaments 42 at both ends of the segment 40 repel each other and separate, creating interstices 44. Such separation can be attributed to surface activation treatment, and even an electrostatic effect of the severing process, as described hereinabove. The segment 40 is a reinforcement component that is suitable for SMC and other composite applications.

Figure 12:
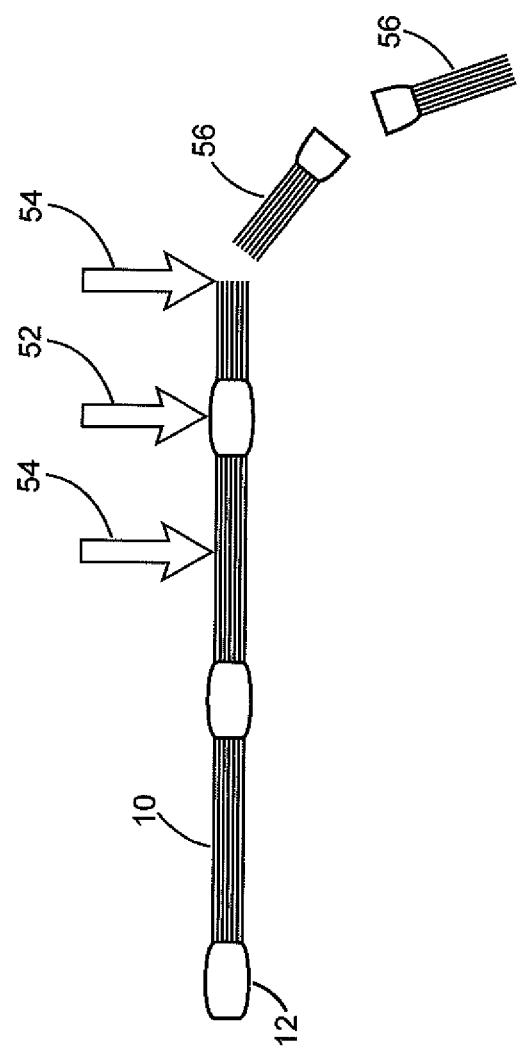
FIG. 12 is a schematic diagram showing alternative carbon fiber cutting locations in accordance with an example of present invention.

Alternatively, the tow can be cross-cut at any locations therealong, in regular or irregular lengths. The resulting segments must contain at least a portion of a sizing spot in order to achieve the benefit thereof. Cross-cutting can be close to or even through a sizing spot, as illustrated in FIG. 12. The tow 10 is cut through the sizing spots 12 and also between the sizing spots 12, as shown by respective arrows 52, 54, resulting in alternative segments 56 that resemble half of a bowtie. It is important the at least one end of a segment 56 be unsized to allow the filaments 42 to repel each other and separate.

Figure 13:
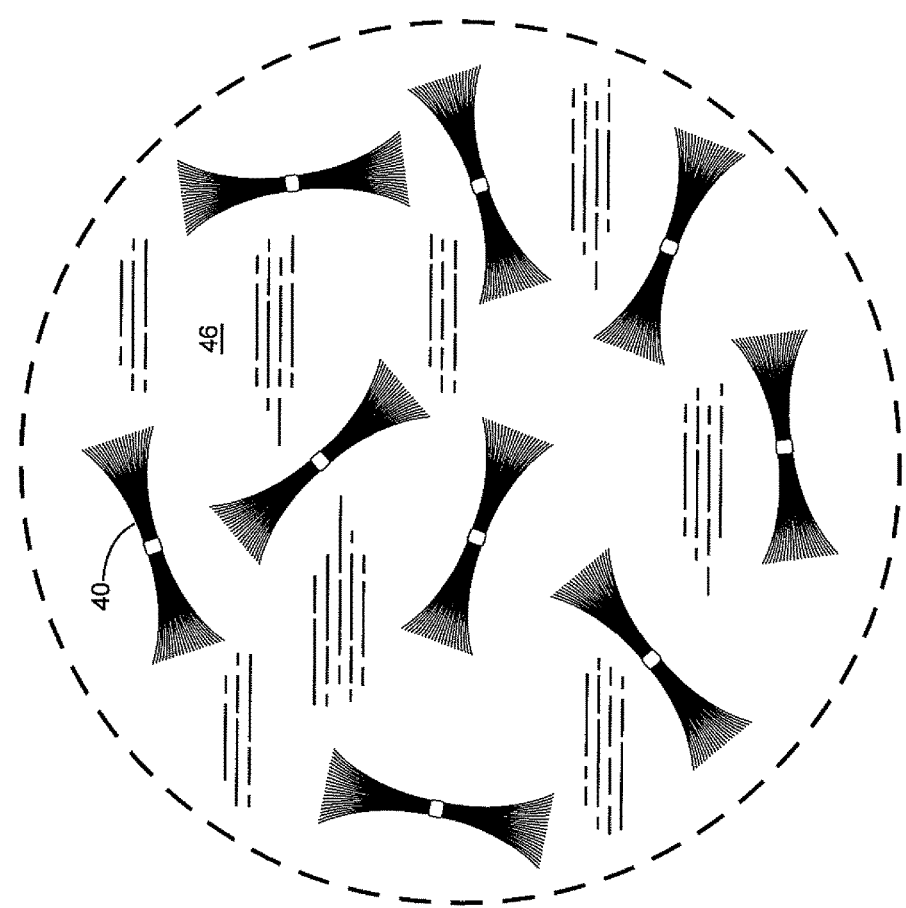
FIG. 13 is a schematic diagram showing a composite comprising a resin matrix and dispersed carbon fiber segments in accordance with an example of present invention.

FIG. 13 shows segments 40 dispersed within a resin matrix 46. The resin 46 penetrates the interstices 44 of the segments 40 and wets the individual filaments 42. Polar oxygen groups on surfaces of the filaments 42 form covalent bonds with the resin 46 resulting in enhanced adhesion of the filaments 42 to the resin matrix 46.

Other dispersed phase materials can also be present in the composite, such as platelets, fibers, whiskers, nanotubes, particles, and the like.

Example I

A tow of unsized carbon fibers was passed through a spraying device for intermittently applying sizing as shown in FIG. 1. An aqueous emulsion (30% solids) of Hydrosize© EP834-PL, a proprietary epoxy resin sizing available from Michelman, Inc., 9080 Shell Road, Cincinnati, Ohio 45236-1299, was deposited thereon at sizing sites of 0.5" in length and spacing of 4". Each sizing site contained about 0.2 g of the sizing. The tow was passed through a drying oven and exposed therein to a temperature of 75° C., in which the tow had a residence time of approximately 1 min. The tow was subsequently surface treated at 80° C. using a gas phase thermochemical technique as described in U.S. Patent Application Publication No. 2014/0220248 to Felix L. Paulauskas, et al. The tow was subsequently cut into segments at about the midpoint between each of the sized spots to make a multiplicity of segments. The filaments at the ends of the segments repelled each other and spread open as illustrated in FIG. 11.

Example II

Figure 14:
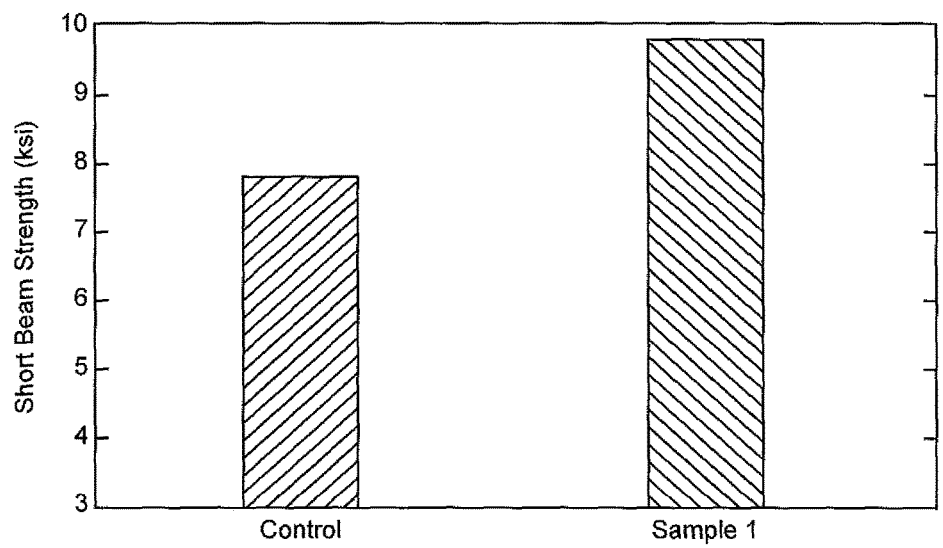
FIG. 14 is a bar graph showing short-beam-shear-strength test results.

Composite sample 1 was made using segments made in accordance with Example 1 dispersed in a thickened Derakane© 782 vinyl ester resin (available from Ashland Inc., 50 E. RiverCenter Blvd., Covington, Ky. 41012-0391 having a viscosity greater than 1300 cP. Test specimens of sample 1 were subjected to short-beam-shear-strength testing, along with test specimens of a control sample made with fully sized fibers. FIG. 14 shows the test results.

Example III

Figure 15:
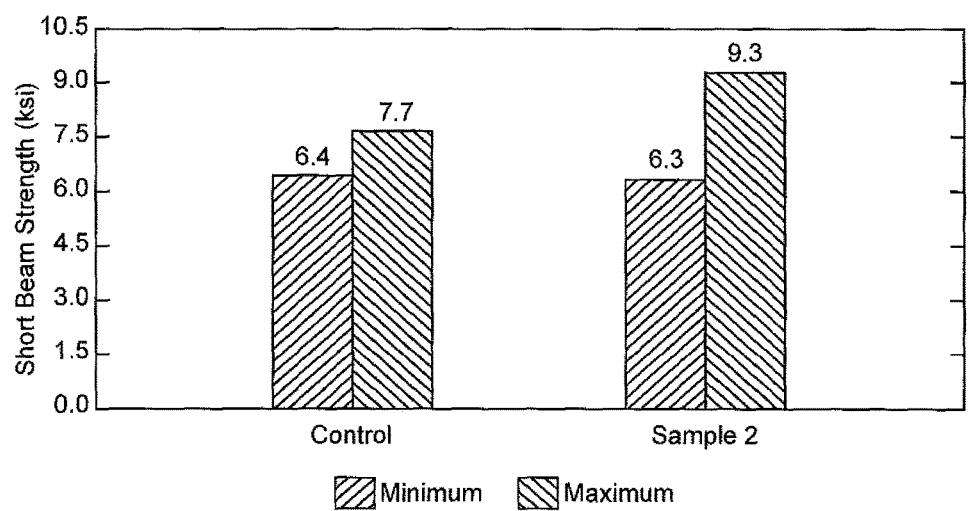
FIG. 15 is a bar graph showing further short-beam-shear-strength test results.

Composite sample 2 was made using segments made in accordance with Example I dispersed in a Derakane© 782 vinyl ester resin having a viscosity equal to about 1300 cP. The lower viscosity helped to impregnate the fibers during the process, leading to improved saturation and a better composite. Test specimens of sample 2 were subjected to short-beam-shear-strength testing, along with test specimens of a control sample made with fully sized fibers. FIG. 15 shows the test results, indicating minimum and maximum strength among the test specimens.

Although the test specimens showed improved strength, it should be noted that the experimental steps had to be carried out sequentially, with spooling and unspooling between each step, which tended to become somewhat damaged (by fraying, unraveling, tattering, and the like). It is contemplated that in a production line the steps can be carried out in a single line with no spooling and unspooling, thus avoiding the damage noted above. It is further contemplated that the strength of composites made in a production setting with undamaged fibers can approach 12 ksi.

While there has been shown and described what are at present considered to be examples of the invention, it will be obvious to those skilled in the art that various changes and modifications can be prepared therein without departing from the scope of the inventions defined by the appended claims.

What is claimed is:

1. A composite comprising a resin matrix and a reinforcement component dispersed therein, said reinforcement component comprising a plurality of bundles of carbon filaments, each of said bundles defining at least one unsized end region wherein said filaments can repel each other and separate, defining interstices between adjacent filaments, said bundle further defining a sized region wherein said filaments are bound together by a sizing composition and;
   wherein a majority of said bundles define two unsized end regions, said sized region being disposed between said two unsized end regions.

2. The composite in accordance with claim 1 wherein resin penetrates the interstices and wets the individual filaments of the bundle.

* * * * *